Patented July 12, 1938

2,123,531

UNITED STATES PATENT OFFICE 2,123,531

CHEWING GUM BASE CONTAINING CYCLIC AROMATIC PETROLEUM RESINS

George A. Hatherell, Roscoe, Calif., assignor to Frank A. Garbutt, Los Angeles, Calif.

No Drawing. Application July 11, 1936, Serial No. 90,183

4 Claims. (Cl. 99—135)

My invention relates to chewing gum and more particularly to chewing gum of the general type known as "chicle base gum", gums of this type being largely consumed at this time in the United States. Whenever the term "chewing gum" is used hereinafter, it is to be understood that I refer to chewing gum of this particular variety. Such gums were originally compounded almost wholly from chicle, a natural gum originally imported to this country from Central America. The supply of chicle is, however, limited and due to the enormous consumption of chewing gum, gum manufacturers have been forced to resort to the use of other gums, collectively termed "chicle substitutes". Among such substitutes are jelutong, gutta Kay, and gutta Hang Kang. The term "chicle substitute" is used herein to denote a mixture which may contain some chicle but also substantial proportions of other natural gums. The term "natural gum" is used herein to denote chicle and other gums of a vegetable origin.

In the production of chewing gum, it is common for the manufacturer to first produce a chewing gum base and to then mix the base with sugar, glucose, and flavoring materials to produce the desired variety of chewing gum. The term "chewing gum base" as used herein is, however, used in a somewhat broader sense to denote any compounded ingredient which may be used in the production of chewing gum.

The principal object of my invention is to produce a base for chewing gum which will have certain new and useful properties.

Chicle is the solidified sap of certain trees and seems to contain certain constituents which are identical with or similar to certain of the constituents of India rubber. In addition, chicle also contains a considerable proportion of resin or resinous material. This resinous material seems to play an important part in imparting to chewing gum the physical characteristics necessary to produce a marketable gum, and it is probable that some of the difficulties experienced by chewing gum manufacturers in compounding chewing gum bases using chicle substitutes is due to a deficiency in the resinous components of these substitutes.

It is a further object of my invention to provide a chewing gum base which contains natural gums which are deficient in their resinous component but in which this deficiency is compensated for by the use of a petroleum resin.

While various petroleum resins might be used, I have found that resins of the cyclic aromatic type are particularly adapted for my purpose. Such resins may be produced by various processes, for example, those disclosed in Patents 1,989,045 and 2,029,382 issued to Merrill, and Patent 2,002,004 issued to Gard. Artificial resins that are suitable for my purpose, including those produced by the processes described in said patents, are hereinafter called "cyclic aromatic petroleum resins". This designation is chosen primarily for its convenience, rather than for its chemical accuracy, and denotes a class of resins having the general physical characteristics of the resins produced by the patents above identified. The exact chemical nature of such resins has not been clearly established as far as I am aware.

It is possible to produce cyclic aromatic petroleum resins which have a melting point somewhere between 100° F. and 150° F., and I have found that such resins are capable of producing chewing gum bases having excellent characteristics, although excellent bases can be produced from resins not melting within these limits by proper compounding.

For example, the best mode which I have discovered by which the principles of my invention may be applied may be explained as follows:

I place in a steam jacketed mastication kettle a mixture of natural gums and cyclic aromatic petroleum resin having a melting point of from 100° F. to 150° F. For example, I may use:

| | Parts |
|---|---|
| Jelutong | 40 |
| Gutta Kay | 20 |
| Gutta Hang Kang | 5 |
| Cyclic aromatic petroleum resin | 35 |

The mixture is heated and agitated while in the kettle to produce a thorough mixture and may be treated with a weak solution of caustic soda and washed and neutralized. After neutralization the mixture may be vacuum dried to produce the desired base, which may be used alone or in combination with chicle to produce the desired chewing gum.

I have also found that even where chicle is used in compounding a base, the addition of cyclic aromatic petroleum resin thereto considerably improves the qualities of the base.

The principal undesirable quality found in ordinary chewing gum which is compounded from chicle or chicle substitutes is that it is rough and granular, which is objectionable in that it hurts the chewing qualities of the gum. This undesirable quality becomes even more marked as the gum ages. I have found that by the use of my invention a much smoother base than that commonly found in ordinary gum is produced. Ordinary gums also have a tendency to become very brittle and develop a bad taste with age, and I have found that by the use of my invention the keeping qualities of the gum are improved.

I claim as my invention:

1. A chewing gum base consisting of a cyclic aromatic petroleum resin and natural gum.

2. A chewing gum base containing a cyclic aromatic petroleum resin melting at from 100° F. to 150° F. and a natural gum.

3. A chewing gum base comprising one-third cyclic aromatic petroleum resin and approximately two-thirds natural gum.

4. A chewing gum base comprising one-third cyclic aromatic petroleum resin melting at from 100° F. to 150° F. and approximately two-thirds natural gum substitutes for chicle.

GEORGE A. HATHERELL.